No. 739,172. PATENTED SEPT. 15, 1903.
H. C. HAM.
GRAIN DRILL.
APPLICATION FILED OCT. 23, 1902.
NO MODEL. 2 SHEETS—SHEET 1.

Witnesses
Irwin H. Price
Edward Haat

Inventor
Henry C. Ham
by his Attorneys

No. 739,172. PATENTED SEPT. 15, 1903.
H. C. HAM.
GRAIN DRILL.
APPLICATION FILED OCT. 23, 1902.
NO MODEL. 2 SHEETS—SHEET 2.

Witnesses
Irwin N. Price
Edward Haat

Inventor
Henry C. Ham
by Stem Heidman Mitchell
his Attorneys.

No. 739,172. Patented September 15, 1903.

UNITED STATES PATENT OFFICE.

HENRY C. HAM, OF LIBERTY, INDIANA, ASSIGNOR TO RUDE BROTHERS MANUFACTURING COMPANY, OF LIBERTY, INDIANA.

GRAIN-DRILL.

SPECIFICATION forming part of Letters Patent No. 739,172, dated September 15, 1903.

Application filed October 23, 1902. Serial No. 128,482. (No model.)

*To all whom it may concern:*

Be it known that I, HENRY C. HAM, a citizen of the United States, and a resident of Liberty, in the county of Union and State of Indiana, have invented a certain new and useful Improvement in Grain-Drills, of which the following is a full, clear, and exact description, reference being had to the accompanying drawings, which form part of my specification.

My invention relates generally to grain-drills of the class in which disk furrow-openers are used, either single or double, the disks carrying hoes to which the grain is fed from a hopper suitably supported above them through flexible tubes in the ordinary manner, and particularly to a one-horse drill in which are preferably used five disks or five pairs of disks when a double-furrow opener is used, although my drill may be used with more disks than this number. A successful single-horse drill of this general character has been long sought for by manufacturers, but without any satisfactory outcome of their efforts, said drill having hitherto been modeled after the ordinary one-horse hoe-drill.

The object of my invention is to produce a single-horse disk drill especially adapted for seeding in corn and one which may be used on all kinds of ground and which needs no "scratcher" or drag to break down the weeds in advance of its progress.

In my improved drill the disks are so hung that they will automatically adjust themselves to any unevenness of the soil in such manner that all the disks sow at the same depth, no matter how uneven the soil, while at the same time the entire drill will run with such an even motion that the hopper and handles and frame of the drill will run as evenly in going over rough ground as they would when running over a smooth floor. This produces a very light draft. To these features I add an exceeding simplicity of construction with few or no parts to get out of order.

The various advantages of my drill will appear more clearly as I proceed with my specification.

Figure 1:
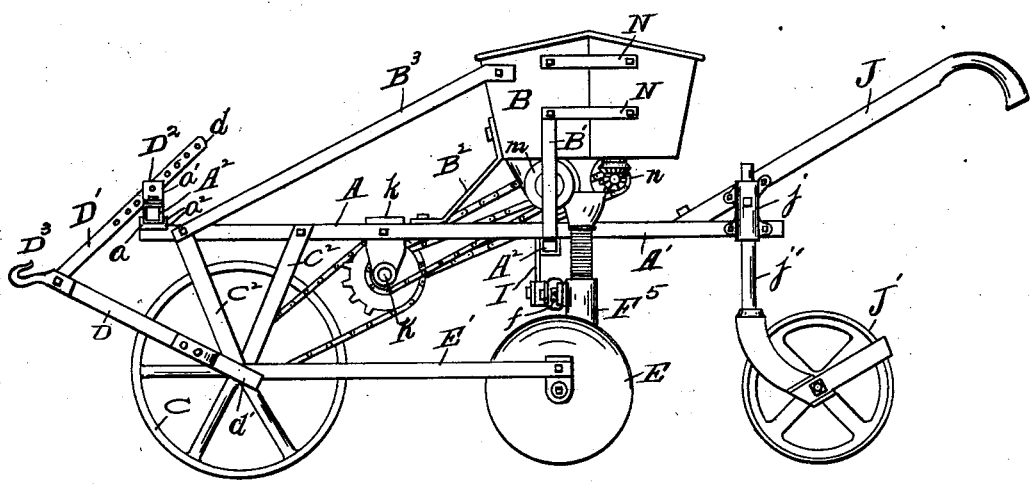
Figure 2:
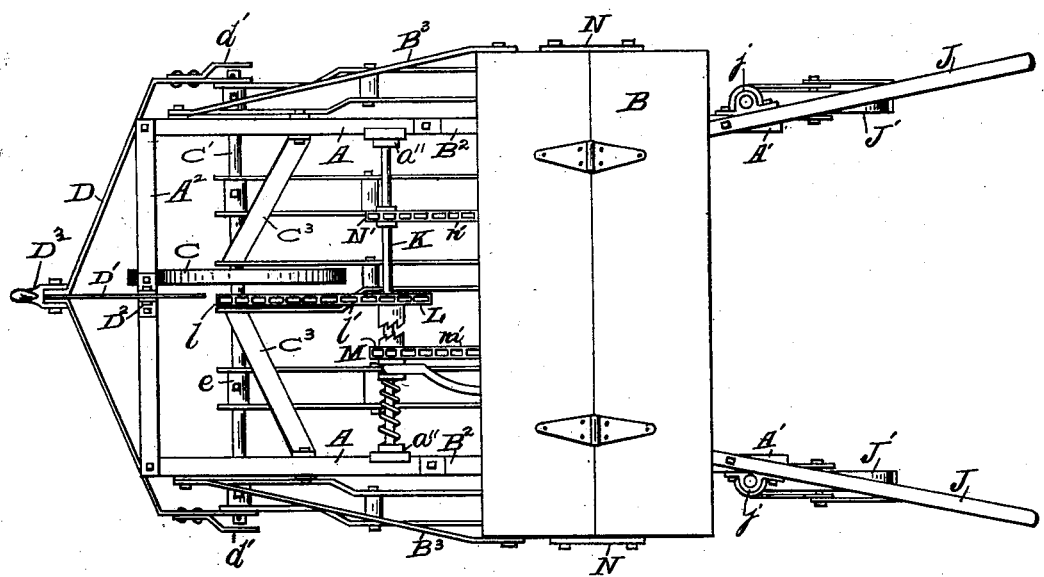
Figure 3:
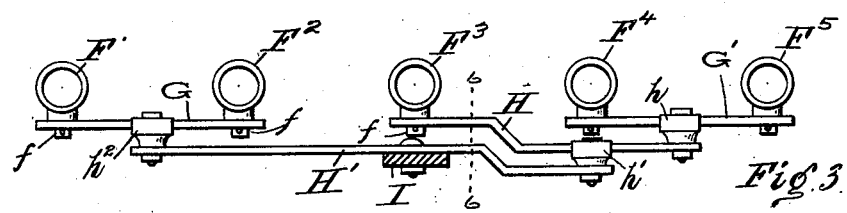
Figure 4:
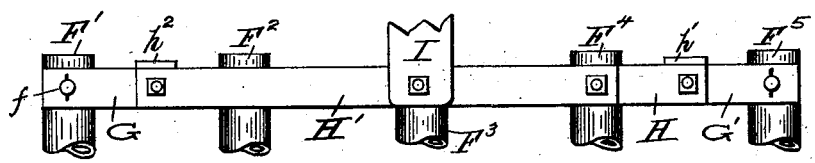
Figure 5:
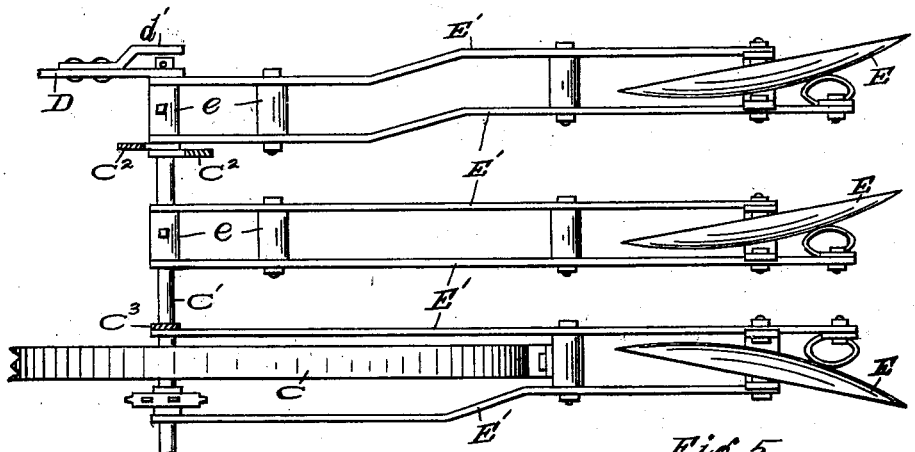
Figure 6:
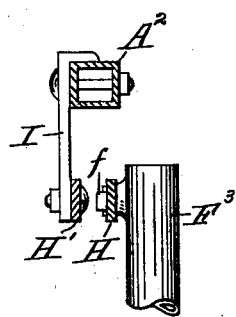

In the drawings, Figure 1 is a side elevation of my improved drill. Fig. 2 is a top plan view of the same. Fig. 3 is a top plan view of the mechanism whereby the hose or grain-tubes are secured to the frame. Fig. 4 is a front elevation of Fig. 3. Fig. 5 is a top plan view showing the manner of attaching the drag-bars, and Fig. 6 is a section of Fig. 3 on the line 6 6.

The operative parts of my improved drill are supported on a frame A, made, preferably, of square pipes and composed of the longitudinal pieces A' A' and the cross-pieces $A^2 A^2$, secured together by plates $a$ and bolts $a'$. The plates $a$ have grooves at right angles on their opposite faces which receive the pipes A' $A^2$, the flanges $a^2$ embracing the edges of the tubular bars, and thus maintaining them in proper angular relation to each other. The hopper B is supported above the frame by means of straps B' $B^2$ at each end and straps $B^3$, which extend from the fore part of the frame to the top of the hopper, and thus securely brace it in place. The rear cross-piece $A^2$ is prolonged beyond the longitudinal pieces A' A' in order to receive the straps B', which support the ends of the hopper.

The frame A is carried at its forward end by a pilot-wheel C, journaled on an axle C', which extends out at each side of the pilot-wheel and is secured to the frame A by means of the depending straps $C^2 C^2$ at each end and the straps $C^3$, which run from a point of the frame slightly back of the front cross-piece $A^2$ to a position on the axle at each side of the pilot-wheel C, where they are provided with bifurcated ends which embrace the axle C'. The axle C' is thus securely supported at its ends and braced at the middle. A draft-frame D is pivoted at each end of the axle C', as seen in Fig. 2, and is supported by a bar D', pivoted at one end to the forward end of the frame D and at its other end connected to an angle-plate $D^2$ by means of a pin or bolt. The bar D' has several holes $d$, so that the height of the hook $D^3$, to which the swingle-tree is attached, may be raised or lowered to suit the height of the horse. Angular bars $d'$ are secured at the ends of the frame D in such a manner as to cover the ends of the axle C' and protect them from trash.

E represents the disks mounted in any convenient or usual manner on the drag-bars E', which are pivoted at their forward ends on the axle C' and held in position by suitable spacing-blocks e, which are rigidly attached by set-screws to the axle C'.

F', F², F³, F⁴, and F⁵ are the hoes, which are secured to the disks in any convenient or usual manner and are provided with projecting pins or lugs f, by means of which they are attached to an equalizer, now to be described. Each pair of the outside hoes is connected together by bars G G', (see Fig. 3,) which are pivoted at each end on the pins f and held thereon by cotter-pins or in any other convenient manner. The middle hoe is connected by a bar H to a lug h, secured to the bar G' at its middle point, said bar being pivotally connected at one end to the hoe F³ and at the other to the lug h. A lug h' is secured to the bar H'' approximately in front of the hoe F⁴, and a lug h² is secured to the bar G at its middle. A bar H' is pivotally connected at one end to the lug h² and at the other end to the lug h'. The bar H' is pivotally secured to a depending casting I, which is secured to the rear cross-piece A². It is evident that by this arrangement each hoe will rise and fall in accordance with the inequalities in the soil over which the drill passes, the weight of the drill being carried by the pilot-wheel C and by the disks E. The bars G G' H H' are connected together in accordance with the theory of moments, so that, for example, the three hoes F³, F⁴, and F⁵, taken with the short arm of the bar H', will have the same moment about the center of the casting I as the two hoes F' F² have when taken with the longer arm of the bar H', and so that the moment of the hoe F³ with the long arm of the bar H will have the same moment about the lug h' as the two hoes F⁴ F⁵ taken with the short arm thereof. It is evident that by this construction if one of the disks strikes a hill, which would tend to raise the disk or to increase the pressure thereof, this increased pressure will be communicated through the connecting-bars to the other disks and the pressure thus equalized throughout; thereby decreasing the pressure on the disk which is passing over the hill. The disk will thus always have the same pressure, no matter what the character of the ground.

I am aware that it is old in the art to balance two hoes against two other hoes—as, for example, in the Patent No. 311,397, granted January 27, 1885, to John M. Westcott—but as far as I am aware the principle has never been applied in such a manner as to balance two hoes against one or so as to balance two hoes against three.

It is evident that by the placing the three hoes F³ F⁴ F⁵ and their connections on the other side of the supporting-casting I my grain-drill may be provided with six disks instead of five. It is also evident that two supporting-castings instead of one might be used, the bar G being pivoted to one and the bar H to the other at the point of attachment of the casting h. I prefer, however, the method of attachment described with the use of one supporting-casting, as I find this produces better results, except in the case of the use of six hoes or disks, when it is better to use two supporting-castings.

The longitudinal bars A' project beyond the hopper and are provided with handles J, which are secured thereto at their ends and braced in position by castings j, which are secured at one end to the end of the longitudinal bars A' and at the other end to the handles J. These castings j are provided with sockets, which provide a bearing for round bars j'', which carry at their lower ends pivoted caster-wheels J', which serve to support the drill when it is being transported from place to place. They also serve to decrease the pressure on the disks when the entire weight of the drill would be too great and determine the depth of planting.

A shaft K is hung in bearings a'', which are secured to the longitudinal pieces A' of the frame. Sprocket-wheels L M are keyed to this shaft, and the one, L, is connected by a sprocket-chain l' to a sprocket-wheel l, keyed to the axle C', and the other, M, connected by a sprocket-chain m' to a sprocket-wheel m, which operates the feed mechanism by which the grain is fed to the hoes in the usual manner.

By means of straps N N, I secure a fertilizer-hopper to the grain-hopper B, and when this is used the shaft K is provided with another sprocket-wheel N', which is connected by a sprocket-chain n' to the shaft n, operating the feeding mechanism of the fertilizer. The shaft K is provided with the usual clutch mechanisms, whereby the feeding mechanisms may be thrown in or out of gear; but as my invention does not relate to these points particularly I shall not describe them.

I do not wish to be limited to the exact details of mechanical construction which I have described and shown in the drawings, as of course these may be varied without departing from the spirit of my invention. I find, however, that a drill constructed with these details as described is very light, strong, and durable and comparatively cheap of manufacture.

Having thus described my invention, what I desire to claim as new, and to cover by Letters Patent, is—

1. In a single-horse disk-drill, the combination of a frame supporting a hopper, an axle supported from said frame, a pilot-wheel mounted on said axle, the disks, hoes and drag-bars, the latter pivoted to said axle, and an equalizer secured to the frame and pivoted to the hoes, substantially as described.

2. In a single-horse disk-drill, the combination of a frame and a hopper carried thereby, a pilot-wheel supporting one end thereof, the disks, hoes and drag-bars, the latter in pivotal relation with the frame and an equalizer supported from the frame and pivotally connected to the hoes, substantially as described.

3. In a single-horse disk-drill, the combination of a frame and hopper carried thereby, a pilot-wheel supporting one end of said frame, the hoes, disks and drag-bars, the latter having their front ends in pivotal relation with the frame and an equalizer supported from the frame and pivotally connected to the hoes, substantially as described.

4. In a single-horse disk-drill, the combination of a frame and hopper carried thereby, a pilot-wheel supporting one end of said frame, the hoes, disks and drag-bars, the latter having their front ends in pivotal relation with the frame, and an equalizer pivoted to the frame and supporting the hoes, comprising a bar carrying at its ends pivotally-connected bars, one of which carries at each end a hoe pivotally connected thereto, and the other of which carries at one end a pivotally-connected hoe and at the other end another bar pivotally connected at each end to hoes, all arranged to balance about the pivotal points, substantially as and for the purpose described.

5. In a disk-drill, the combination with the hopper, supporting-frame, pilot-wheel, disks, hoes and drag-bars, the latter in pivotal relation to the frame, a bar, and means for pivotally supporting the same, said bar carrying at one end a hoe in pivotal relation therewith, and at the other end a bar in pivotal relation therewith, said latter bar supporting at each end pivotally-connected hoes, the pivotal points being all arranged so that the hoes will balance, substantially as and for the purpose described.

6. In a single-horse disk-drill, the combination of a frame and hopper carried thereby, a pilot-wheel supporting one end of said frame, the disks, hoes and drag-bars, the latter in pivotal relation to the frame, an equalizer supported by the frame and pivotally connected to the hoes and caster-wheels adjustably connected to said frame, substantially in the manner described.

7. In a grain-drill, a frame composed of sections of square pipe bolted together, a hopper supported and braced above said frame by iron straps, an axle carried by depending straps at each side of the frame and braced at or near its middle by other iron straps secured to the sides of said frame, a pilot-wheel mounted on said axle, a draft-frame pivoted to the ends of said axle, and a bar pivoted at one end to the draft-frame, and secured at the other end to the frame, said bar being provided with holes to adjust the position of said draft-frame, substantially as and in the manner described.

HENRY C. HAM.

Witnesses:
 HERBERT DARR,
 OWEN RARIDEN.